(12) United States Patent
Waclawsky et al.

(10) Patent No.: US 7,116,682 B1
(45) Date of Patent: Oct. 3, 2006

(54) METHODS AND APPARATUS FOR DYNAMIC BANDWIDTH ADJUSTMENT

(75) Inventors: John G. Waclawsky, Fredrick, MD (US); Balasubramanian Kalyanasundaram, Herndon, VA (US); Mahendran Velauthapillai, Adelphi, MD (US)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 09/811,969

(22) Filed: Mar. 19, 2001

(51) Int. Cl.
*H04J 3/16* (2006.01)

(52) U.S. Cl. .................... 370/468; 709/226

(58) Field of Classification Search ............... 370/468, 370/465, 329, 335, 337, 341
See application file for complete search history.

(56) References Cited

U.S. PATENT DOCUMENTS

| | | | |
|---|---|---|---|
| 5,506,834 A * | 4/1996 | Sekihata et al. | 370/253 |
| 5,815,492 A | 9/1998 | Berthaud et al. | 370/234 |
| 5,918,002 A * | 6/1999 | Klemets et al. | 714/18 |
| 5,918,012 A * | 6/1999 | Astiz et al. | 709/217 |
| 5,953,344 A | 9/1999 | Dail et al. | 370/443 |
| 6,011,776 A | 1/2000 | Berthaud et al. | 370/232 |
| 6,021,268 A | 2/2000 | Johnson | 395/500.24 |
| 6,085,241 A * | 7/2000 | Otis | 709/223 |
| 6,097,733 A * | 8/2000 | Basu et al. | 370/468 |
| 6,122,514 A | 9/2000 | Spaur et al. | 455/448 |
| 6,292,834 B1 * | 9/2001 | Ravi et al. | 709/233 |
| 6,304,909 B1 * | 10/2001 | Mullaly et al. | 709/232 |
| 6,320,846 B1 * | 11/2001 | Jamp et al. | 370/235 |
| 6,542,481 B1 * | 4/2003 | Foore et al. | 370/329 |
| 6,560,243 B1 * | 5/2003 | Mogul | 370/468 |
| 6,590,865 B1 * | 7/2003 | Ibaraki et al. | 370/230 |
| 6,684,087 B1 * | 1/2004 | Yu et al. | 455/566 |
| 6,715,056 B1 * | 3/2004 | Amro et al. | 711/171 |
| 6,715,126 B1 * | 3/2004 | Chang et al. | 715/500.1 |
| 6,754,700 B1 * | 6/2004 | Gordon et al. | 709/219 |
| 6,769,019 B1 * | 7/2004 | Ferguson | 709/219 |
| 6,771,661 B1 * | 8/2004 | Chawla et al. | 370/468 |
| 6,795,848 B1 * | 9/2004 | Border et al. | 709/213 |
| 6,848,004 B1 * | 1/2005 | Chang et al. | 709/232 |

* cited by examiner

*Primary Examiner*—Ricky Q. Ngo
*Assistant Examiner*—Andrew C. Lee
(74) *Attorney, Agent, or Firm*—Chapin IP Law, LLC; Barry W. Chapin, Esq.

(57) ABSTRACT

A configuration of a communications device, and a method for its operation are provided for automatically and dynamically adjusting bandwidth of a communications channel. The device and method operate to detect events indicating anticipated changes in bandwidth requirements of the communications channel. Such events may be browser or bandwidth related events, for example, that indicate a forthcoming requirement for increased or decreased bandwidth. The device and method then can extract a bandwidth determination factor if available and then calculate a new value for a bandwidth setting of the communications channel in response to detecting such an event and can adjust a bandwidth characteristic of the communications channel according to the new value of the bandwidth setting such that communications channel can accommodate the anticipated change(s) in the bandwidth requirement. The invention can operate in wireless and non-wireless communications systems to cause bandwidth to be adjusted to closely track usage requirements of the communications channel.

27 Claims, 5 Drawing Sheets

REAL-TIME DYNAMIC BANDWIDTH ADJUSTMENT

METHODS AND APPARATUS FOR DYNAMIC BANDWIDTH ADJUSTMENT

FIELD OF THE INVENTION

The present invention generally relates to mechanisms and techniques for allocating bandwidth in a communications channel, and more particularly, to a system that allows for the dynamic adjustment of bandwidth requirements in a communications channel in response to the occurrence of bandwidth events.

BACKGROUND OF THE INVENTION

In a communications system, bandwidth is an amount of information such as voice or data content that may be transferred over a communications channel in a predetermined amount time. For example, a computer network communications system can include a computer system (e.g., a personal computer or workstation) equipped with a communications interface (e.g., a network interface card or a modem) that interconnects via a data link to a network communications device (e.g., a router or network access server). The computer system can establish a communications channel (i.e., a dial-up or other network connection) to the network communications device. The communications channel might operate to allow the transfer of data between the computer system and the network communications device at a bandwidth of 56 kilobits per second (Kbps) (in the case of a dial-up connection). A communications software application such as a web browser can operate on the computer system and can use the communications channel to exchange information with other computer systems on the network at a maximum data rate which is typically determined by the prescribed bandwidth (e.g., 56 kbps in this example) of the communications channel.

In some types of communications systems, an interconnection of network communications devices forms a network infrastructure (i.e., network pathways that allow the transmission of information between computer systems). The network communications devices can inter-operate with each other to allocate bandwidth to communications channels (e.g., the connection paths that support the flow of information between computer systems coupled to the network) in varying amounts. Such network communications devices might provide or allocate large amounts of bandwidth to pathways between some computer systems or devices, while pathways between other computer systems or devices might only receive or require an allocation of lesser amounts of bandwidth.

As an example, in a wireless communications system, a wireless user device such as a wireless telephone (e.g., a cell phone), wireless palm-top computer, or other such device can communicate with a wireless base station transceiver (e.g., a cellular communications tower or based station antenna) over one or more wireless communications channels or links allocated to the wireless device by the base station, which operates as the network communications device in this example. Typically, a number of resources of the network communications device collectively operate to provide the wireless communications channel(s) at prescribed level(s) of bandwidth. Such resources may include, for example, transmit and receive frequencies, timeslots in which to transmit (e.g., in time division multiple-access (TDMA) wireless systems), frequency codes used for encoding data (e.g., in code division multiple-access (CDMA) wireless systems), and/or power levels at which to transmit information. If a wireless base station allocates, for example, a high transmission power level to a particular user communications device (e.g., a CDMA wireless device), that device might be able to transfer higher amounts of data over the wireless communications channel to the base station. Conversely, if the base station instructs the device to transmit at a low power level (e.g., so as not to interfere with transmission of other wireless devices), the data rate and hence the bandwidth allocated to the device is kept relatively low.

The amount of bandwidth that a network communications device can allocate or provide to a communications channel for use by a user device (e.g., wireless device or user controlled computer system) can depend upon a number of factors such as the physical characteristics of the connection, data link or medium supporting the communications channel (e.g., wireless vs. electrical vs. optical connections), software configurations of the devices (e.g., which communications protocols are in use), hardware configurations of the devices (e.g., buffer sizes, memory sizes, processing and circuitry speeds of processors and circuitry within the device), number of other devices competing for the resources, authorization policies for use of the resources, and so forth.

In computer network environments, network engineers have developed data communications protocols to allow a computer system to "reserve" an amount of bandwidth over a communications channel (e.g., a path through the network) for use by that computer system. One such protocol is called the Reservation Protocol (RSVP). RSVP allows a destination computer system that is receiving a stream of data (e.g., a stream of packets received using the Internet Protocol or IP) from a particular source computer system (i.e., the computer system from which the stream of data originates) to send an RSVP request message upstream along the path of networked data communications devices (e.g., along the path of routers, switches, etc. in the computer network) that transport the stream of packets from the source computer system to the destination computer system. The upstream RSVP request message requests that each network communications device along the path reserve or set-aside a particular amount of bandwidth for use by the stream of packets being transmitted from the source to the destination computer system. Each network communications device (e.g., each router or switch in the network) along the path that receives the RSVP request message can allocate bandwidth resources (e.g., virtual circuits, data buffers, and so forth) to handle the forthcoming packets of information associated with the stream of data.

Once a network communications device such as a router or switch reserves bandwidth resources for a particular stream of data, the network communications device does not use those resources for transporting other streams of data for as long as those resources remain allocated on behalf of the particular data stream for which they were originally reserved. In this manner, a requesting computer system can establish or pre-allocate a data communications channel at a prescribed bandwidth level for use in transporting information through a series of network communications devices in a network. Once the communications session using the reserved bandwidth is complete (i.e., once communications has ended), the destination computer system can send an RSVP release message to each network communications device in the path of the stream of data in order for those data communications devices to release the bandwidth allocated to the stream of data.

In conventional communications systems, users of data communications channels (e.g., users controlling the devices that require the use of communications channels) often pay different costs for different levels of bandwidth. Generally, a communications service provider (e.g., an Internet or wireless communications network service provider) typically charges a higher proportional cost per unit of time to users of data communications channels that have a high allocation of bandwidth, whereas the service provider charges a lower proportional cost for data communications channels that offer lower bandwidth.

SUMMARY OF THE INVENTION

Conventional techniques for controlling bandwidth allocation in a communications channel suffer from a number of deficiencies. Generally, such deficiencies arise from the fact that conventional techniques that provide for the allocation of bandwidth in a data communications channel are generally static in nature. That is, when communications devices use a conventional bandwidth allocation technique such as RSVP to allocate resources in a data communications channel for use by a particular device, the receiving device makes or requests the bandwidth allocation ahead of time, or before the communications actually take place. As such, the bandwidth allocation is, at best, an estimate of the bandwidth required to handle any expected communications requirements. If the estimate is inaccurate, then too much or too little bandwidth is allocated in the data communications channel as compared to what is actually required to effectively perform communications.

Furthermore, conventional techniques for allocation of resources in a communications channel do not typically take into account changing data communications requirements or network conditions and do not continually and dynamically allocate or adjust an optimal amount of bandwidth for use in a communications channel based upon actual usage requirements. For example, consider a scenario in which a computer system or other communications device reserves a particular amount of bandwidth at a predefined level in a data communications channel using conventional non-adaptive resource allocation techniques such as RSVP. Now suppose that the computer system for which the bandwidth is reserved does not require the full amount of allocated bandwidth to effectively perform communications at all times. This might happen because the estimated amount of allocated bandwidth is too high for the actual required need at each moment during communications. The results of this scenario are i) that the unused portions of bandwidth remain unused by all devices in the communications system (since the bandwidth is set aside for only one device), and ii) that the device (e.g., the computer system, wireless device or other device which requested reservation of the bandwidth) for which the bandwidth is over-allocated pays more cost for the bandwidth than was actually required.

As a specific example, when conventional communications software such as a web browser retrieves and interprets a web page, the bandwidth requirements of the browser software can change dramatically. The web page may include one or more embedded universal resource locators (URLs) which the web browser automatically invokes when they are encountered during interpretation of the web page content in order to retrieve data or content (e.g., graphical images, audio data, video data, text data or other information) which those embedded URLs reference. Each time the Web browser software invokes a reference to a new embedded URL within a web page, the browser software causes the device in which it operates to establish a new communications session with a web server identified by the URL which can serve the content referenced by the URL back to the browser. As a result, during interpretation of a web page, multiple concurrently operating communications sessions may be established between a device operating the browser software and one or more web servers on the computer network. All data traffic of communications sessions often aggregate on to the same communications channel near the browsing device. However, since conventional techniques for allocating bandwidth to a communications channel cannot dynamically adapt bandwidth requirements in real-time based on the actual usage requirements, each of the concurrently operating communications sessions must share the statically allocated amount of bandwidth provided on the communications channel between a device operating the browser and the network communications device to which it connects.

In contrast to conventional systems and techniques for adjusting bandwidth allocation in communications systems, embodiments of the present invention provide mechanisms and techniques to allow for the automatic and dynamic adjustment of bandwidth allocated to a data communications channel based on actual usage requirements of a communications device for which the bandwidth is needed. In particular, embodiments of the invention provide the ability for a device (or for a user controlling a device) to dynamically adjust bandwidth in a data communications channel in response to the detection of certain real-time events.

Using the browser example above, a computer system or other device that operates a browser and that is configured in accordance with embodiments of the invention is able to monitor browser activity and/or browser-related communications traffic on the communications channel to detect certain events such as the occurrence an invocation of an embedded URL within a web page. In response, embodiments of the invention are able to automatically calculate a new bandwidth setting for the communications channel based on an anticipated change in the bandwidth requirements of the communications channel, as indicated by the detection of the event(s). In this particular example, embodiments of the invention are able to calculate a higher bandwidth setting and are able to dynamically adjust a bandwidth characteristic of the communications channel in order to increase the bandwidth of the communications channel to accommodate an increase in data flow which the communications channel will experience when the web server referenced by the embedded URL begins providing URL content (e.g., the graphic, video data, audio data or the like) back to the browser which invoked the reference to the embedded URL. In a similar manner, the same device equipped with an embodiment of the invention can detect other events such as the completion of the transfer of data referenced by the embedded URL. In response to such an event, embodiments of the invention are able to calculate a new lower bandwidth setting and are able to accordingly adjust a bandwidth characteristic of the communications channel in order to lower the bandwidth of the communications channel since the requirement for an increased amount of bandwidth is no longer needed.

In this manner, embodiments of the invention are able to rapidly adjust an amount of bandwidth allocated to a communications channel based on real-time events which occur which relate to device usage or transmission requirements that are anticipated for the communications channel. If, for example, a web page includes multiple embedded URLs, a browser interpreting such a web page will trigger certain events for each invocation of each embedded URL to raise the bandwidth of the communications channel, whereas other events indicative of a decreased bandwidth requirement will cause a device equipped with an embodiment of the invention to lower the bandwidth of the communications channel. An embodiment of the invention which operates in conjunction with a browser can thus continually detect such events in order to successively increase or decrease the bandwidth allocated the communications channel in a real-time, automatic and dynamic manner.

Embodiments of the invention thus provide a cumulative effect allowing bandwidth of a communications channel to be continually boosted or lowered upon the occurrence of multiple events which are require higher or lower anticipated bandwidths. The result of the operation of embodiments of the invention is that the bandwidth allocated to a communications channel on behalf of a device closely tracks usage requirements of the communications channel by the device (e.g., by the browser). In communications systems in which users of a device pay varying costs or charges for varying amounts of bandwidth consumed, embodiments of the invention can help ensure that bandwidth is allocated to a device at optimal levels and only as required. Thus costs for use of the device are effectively minimized to reflect actual usage requirements of the device.

More specifically, embodiments of the invention provide a communications device and method of operation thereof for dynamically adjusting bandwidth of a communications channel. Communications devices in which embodiments of the invention may operate include end-user operated client communications devices such as wireless telephones, personal computer systems and workstations, personal digital assistant devices (e.g., wireless palm top computers equipped with browser functionality), handheld or laptop computing devices or other such devices that operate in either a wireless or non-wireless network environment and that can communicate information such as voice, data or other content with networked communications devices such as wireless base stations, network access servers, routers, switches, hubs, gateways, proxies or other such devices which operate in a communications network. Embodiments of the invention are applicable to voice networks, data networks, wireless networks, computer networks, or any combination of these or other types of communications systems or networks in which bandwidth can be afforded in an adjustable manner to a communications channel.

In particular, method embodiments of the invention include methods for dynamically adjusting bandwidth of a communications channel in a communications device. One such method embodiment includes the steps of detecting a first event indicating a first anticipated change in a bandwidth requirement of the communications channel. The first event may be a browser event that a communications device configured with the embodiment of the invention can detect and which indicates anticipated change in the bandwidth requirements of the communications channel. The embodiment then performs the steps of calculating a first new value for a bandwidth setting of the communications channel in response to detecting the first event and adjusting a bandwidth characteristic of the communications channel according to the first new value of the bandwidth setting such that communications channel can accommodate the first anticipated change in the bandwidth requirement. In this manner, bandwidth is adjusted based on anticipated usage requirements of the communications channel.

In another embodiment, the method further comprises the steps of performing communications on the communications channel using the bandwidth setting having the first new value and detecting an end of the first event indicating that the first anticipated change in a bandwidth requirement of a communications channel is complete. The method also adjusts the bandwidth characteristic of the communications channel to an original value of the bandwidth setting that existed prior to the detection of the first event.

In yet another embodiment, the method includes the steps of detecting a second event indicating a second anticipated change in the bandwidth requirement of a communications channel. The method then calculates a second new value for a bandwidth setting of the communications channel in response to detecting the second event and further adjusts the bandwidth characteristic of the communications channel according to the second new value of the bandwidth setting such that communications channel accommodates the second anticipated change in the bandwidth requirement. Using such techniques, embodiments of the invention are able to raise or lower the bandwidth of the communications channel in response to one or more events, and are then able to perform the converse action of lowering (in the case of initially raising) or raising (in the case of initially lowering) the bandwidth to return the bandwidth setting the initial level allocated to the device.

In a further embodiment, the step of calculating a first new value for a bandwidth setting of the communications channel in response to detecting the first event comprises the steps of determining if the bandwidth event contains a bandwidth determination factor. A bandwidth determination factor may be, for example, event information defined by, contained within or otherwise associated with an event that an embodiment of the invention can use to more precisely determine a bandwidth setting for the communications channel. Examples of bandwidth determination factors are content within a Universal Resource locator (URL) that provides an indication of the type of data that the URL references. For example, one URL might reference a file named "file .txt." In this case, the ".txt" file extension indicates that the URL references the text file which requires a relatively limited amount of bandwidth in order to be transferred on the communications channel. As another example of a bandwidth determination factor, an event may indicate that the new communications session is about to be established with the particular server on a network which serves high volumes of data. For instance, the server may be a video or audio server which streams video or audio data. In such cases, the device configured with this embodiment of the invention may determine by a particular address to which the connection setup is being made that the connection is being established in order to support the transfer of video or audio data. In such cases, an embodiment of the invention may determine that a high bandwidth setting is required in order to significantly boost the bandwidth of the communications channel in order to support such high bandwidth transmissions.

In this embodiment, if the bandwidth event contains a bandwidth determination factor, the method extracts the bandwidth determination factor from the bandwidth event and calculates the new value for the bandwidth setting based on the bandwidth determination factor. Embodiments of the invention may maintain a table or other data structure which indicates corresponding bandwidth setting values based upon particular bandwidth determination factors detected with respect to a particular event. If the bandwidth event contains a bandwidth determination factor, this embodiment adjusts the bandwidth setting to either a next higher level or a next lower level based on the bandwidth event.

In another embodiment, the first bandwidth event indicates a first increased anticipated change in the bandwidth requirement of the communications channel and the second bandwidth event indicates a second increased anticipated change in the bandwidth requirements of the communications channel. In other words, in this embodiment, the first and second events represent back to back bandwidth increase events for which the bandwidth setting of the communications channel should be increased to accommodate additional bandwidth requirements which will be needed during processing of activities related to these events. Also in this embodiment, the first new value of the bandwidth setting is greater than a former value of the bandwidth setting and the second new value of the bandwidth setting is greater than the first new value of the bandwidth setting, such that the bandwidth characteristic of the communications channel is dynamically adjusted to raise the bandwidth of the communications channel in response to the first and second bandwidth events. This embodiment thus provides a cumulative effect of successively raising the bandwidth in response to the first and second events.

In another embodiment, at least one of the first bandwidth event and the second bandwidth event indicate a browser event for at least one of i) a beginning of a communications session, ii) a beginning of content processing; and/or iii) a user bandwidth request for additional bandwidth on the communications channel. These type of events typically cause embodiments of the invention to raise the bandwidth setting of the communications channel.

Embodiments of the invention may detect the beginning of an application session in various ways, such as by monitoring the processing activity of a communications application such as a browser process operating within the communications device or by monitoring communications traffic transmitted from a browser or other communications application operating within the communications device. During such monitoring activity, embodiments of the invention can detect the beginning of the communications session, for example, by detecting known identifiers, signals, flags, or protocol information that occurs to establish a communications session according to specific data communications protocols.

Embodiments of the invention may detect events related to the beginning of content processing, for example, by using an application programming interface (API) that provides access to the communications application (e.g., to the browser) in order to determine when the communications application operating within the communications device begins to process content (e.g., begins interpreting a new web page just loaded from a network). Such content processing as related to a communications application such as a browser frequently includes or requires other data transmission activities related to the communications channel and thus the beginning of content processing can trigger embodiments of the invention to boost the bandwidth setting of the communications channel in order to more efficiently handle such additional transmissions.

A user bandwidth request for additional bandwidth on the communications channel represents an event which is triggered when a user of the communications device specifically indicates, for example, via depressing a bandwidth increase (or decrease, in the case of lowering bandwidth) button, that the user is about to perform an activity requiring additional bandwidth on the communications channel. Embodiments of the invention can then (optionally) prompt the user for a specific bandwidth setting, level, particular change or amount by which to raise the bandwidth setting of the communications channel in response to such an event.

In another embodiment, the first bandwidth event indicates an increased anticipated change in the bandwidth requirement of the communications channel and the second bandwidth event indicates a decreased anticipated change in the bandwidth requirements of the communications channel. Also in this embodiment, the first new value of the bandwidth setting is greater than a former value of the bandwidth setting and the second new value of the bandwidth setting is less than the first new value of the bandwidth setting, such that i) the bandwidth characteristic of the communications channel is dynamically adjusted to raise the bandwidth of the communications channel in response to the first bandwidth event and ii) the bandwidth characteristic of the communications channel is dynamically adjusted to lower the bandwidth of the communications channel in response to the second bandwidth event. In this embodiment then, one event can trigger an embodiment of the invention to raise bandwidth while another event can trigger an embodiment of the invention to lower bandwidth.

In another embodiment, the second bandwidth event indicates an end of the first bandwidth event. In other words, the first and second event are related and that the first event might, perhaps, cause an embodiment of the invention to raise bandwidth while the second event can indicate and end or termination of the first event thus causing an embodiment of the invention to return the bandwidth setting of the communications channel to an original or lowered value.

In another embodiment, the first bandwidth event indicates a browser event for at least one of i) a beginning of a communications session and ii) a beginning of content processing. This embodiment of the invention is thus able to monitor and detect browser activities during browser operation. Also in this embodiment, the second bandwidth event indicates a browser event for at least one of i) an end of a communications session, ii) an end of content processing, and/or iii) a timeout associated with a first bandwidth event. Such types of second events cause embodiments of the invention to lower the bandwidth setting of the communications channel.

In another embodiment, the communications device is a browser enabled device and the first event indicates a browser event requiring a browser in the communications device to access content from a remote computer system. Also in this embodiment, the step of calculating calculates the first new value of the bandwidth setting of the communications channel to accommodate additional bandwidth used to receive the content from the remote computer system.

In further embodiment, the step of detecting the first event includes parsing content accessed by the browser to detect a content reference within the content. In such an embodiment, the content may be a web page and a content reference may be an embedded URL or other mechanism which references content that is to be transmitted over the communications channel when the browser interprets or otherwise processes the content reference within the content.

In yet another embodiment, the step of detecting the first event detects a communications session message generated by the browser. The communications session message may indicate the beginning or end of the communications session, such as a SYN segment of a TCP/IP communications session indicating the beginning of the communications session (and hence an increase in an anticipated bandwidth requirement) or a FIN segment of a TCP/IP communications session indicating the end of the communications session (and hence a decrease in an anticipated bandwidth requirement).

In further embodiment, the communications device is a wireless device and the communications channel is a wireless communications channel (e.g., a TDMA or CDMA wireless communications channel) and the bandwidth characteristic of the communications channel is at least one of i) a timeslot allocation for a time division multiple access (TDMA) protocol operating on the communications channel, or at least one frequency for a code division multiple access (CDMA) protocol operating on the communications channel.

Other embodiments of the invention include communications devices configured to operate according to all of the aforementioned method embodiments summarized above and explained in detail herein. As noted herein, such communications devices can be any type of electronic or computerized communications device. Generally, such embodiments of a communications device configured in accordance with the invention comprise a communications interface (e.g., wireless or non-wireless communications or network interface allowing transmission of information between the communications device and another device such as a network communications device), a memory system (e.g., random access memory or read-only memory or any other type of memory or storage system such as a computer readable medium which can maintain, store or otherwise hold data, information or logic instructions as explained herein), a processor (e.g., any type of circuitry or processing apparatus such as a microprocessor or central processing unit) and an interconnection mechanism (e.g., ancillary circuitry such as a data bus) coupling the communications interface, the memory system, and the processor. In such a communications device, the memory system is configured with a bandwidth manager application, which represents one embodiment of the invention. When the bandwidth manager application is performed (e.g., executed, run, interpreted or otherwise operated) on the processor, the combination of the processor and the bandwidth manager application provides a bandwidth manager process that dynamically adjusts bandwidth of a communications channel operating on the communications interface by performing the operations of any or all of the aforementioned method embodiments via software control, or via hardware and/or software configured to perform those methods and the techniques disclosed herein as the invention.

Other embodiments of the invention that are disclosed herein include software programs to perform the operations of embodiments summarized above and disclosed in detail below. More particularly, a computer program product is disclosed which has a computer-readable medium including computer program logic encoded thereon to adjust usage (e.g., adjust an allocation) of bandwidth for a communications channel according to this invention and its associated operations. The computer program logic, when executed on at least one processor within a communications device, causes the processor to perform the operations (e.g., the method embodiments above, and described in detail later) indicated herein. This arrangement of the invention may be provided as software on a computer readable medium such as an optical medium (e.g., CD-ROM), floppy or magnetic hard disk or other such medium such as firmware in one or more ROM or RAM or PROM chips (e.g., EPROM or EEPROM) or as an Application Specific Integrated Circuit (ASIC). The software, firmware or other such configurations can be installed onto a communications device to cause the communications device to perform the techniques explained herein as the invention.

It is to be understood that the system of the invention can be embodied strictly as a software program, as software and hardware, or as hardware alone. It is also to be understood that the techniques and mechanisms of this invention typically perform (e.g., execute, run, or are otherwise operated) on one or more communications devices that operate in any type of communications system. The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
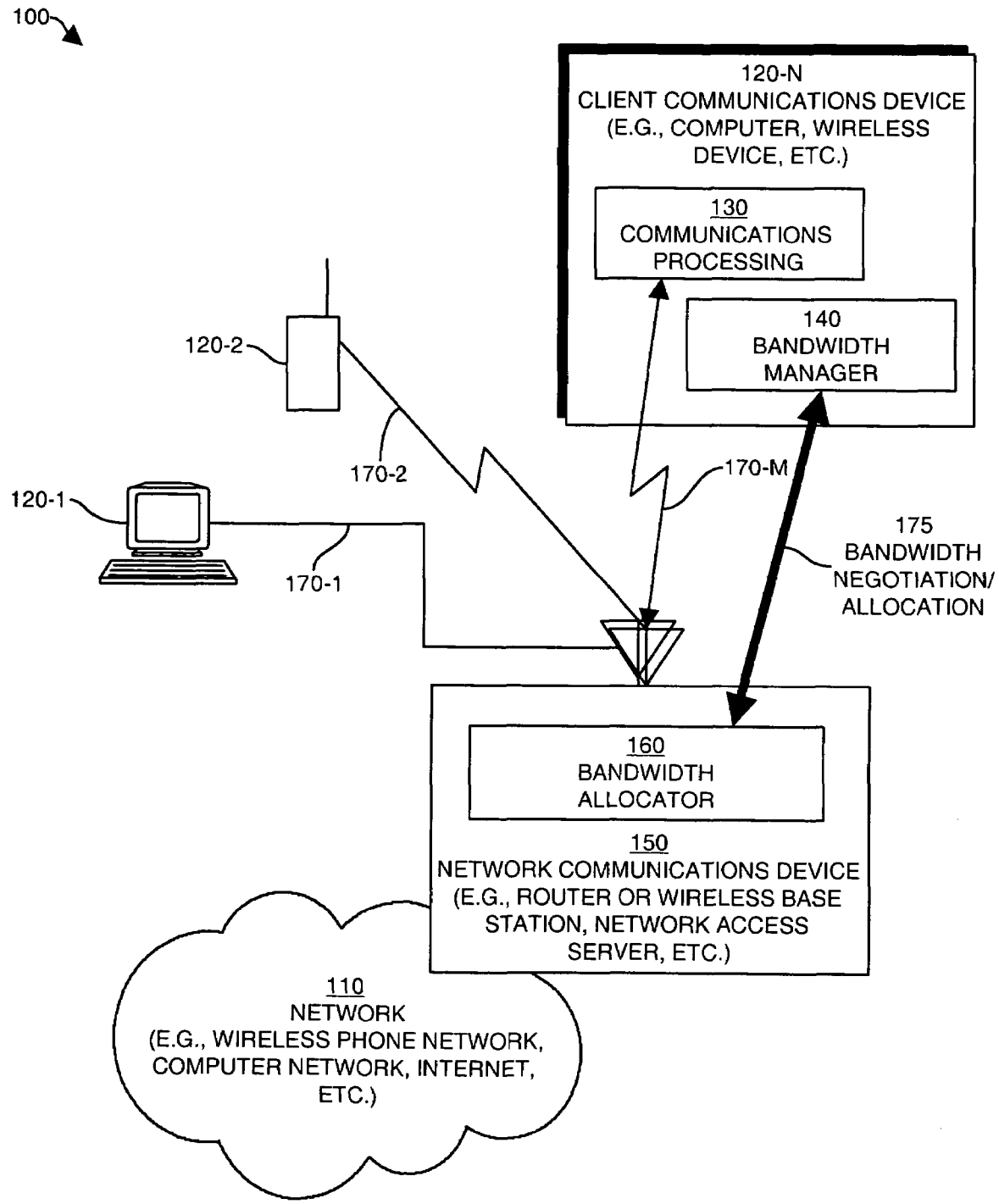
FIG. 1 illustrates a network and computing system environment that is suitable for use in describing example operations of embodiments of the invention.

Embodiments of the invention operate within a communications device to dynamically adjust bandwidth up or down in response to the detection of anticipated changes in bandwidth requirements of a communications channel in use by the device. Preferred embodiments of a communications device configured in accordance with the invention operate a communications application such as browser software that communicates over the communications channel to access data from a remote computer system coupled to a computer network such as the Internet. During such communications, the system of the invention monitors the operations of the communications application and/or other functionality within the communications device to automatically detect certain events that indicate a forthcoming or anticipated requirement for a change in the amount of bandwidth allocated to the communications channel. Upon detecting such an event, the techniques of the invention calculate a new value for a bandwidth setting of the communications channel and then adjust a bandwidth characteristic of the communications channel according to the new value of the bandwidth setting such that the communications channel is provided with a bandwidth that can effectively accommodate or cope with the anticipated change in the bandwidth requirements for that channel. In this manner, embodiments of the invention can automatically detect forthcoming requirements for increases or decreases in the amount of bandwidth allocated to the communications channel for use by the communications device. In response to such events, embodiments of the invention can calculate new bandwidth settings to accommodate the increase or decrease in bandwidth requirements and can then cause the device to negotiate with a network communications device to raise or lower the amount of bandwidth allocated to the communications channel(s) to accommodate the forthcoming change in bandwidth requirements. This bandwidth adjustments can take place substantially in real-time such that the system of the invention adjusts bandwidth of the communications channel in response to real-time usage requirements.

Examples of events which embodiments of the invention can detect that indicate a forthcoming increase in bandwidth requirements for a communications channel are i) the beginning of a communications session (e.g., as indicated by a transmission control protocol (TCP) SYN segment at the start of the TCP/IP communications session), ii) the beginning of content processing (e.g., as indicated by the presence of a content start tag such as <HTML> detected at the start of HTML interpretation of a web page), and/or iii) a user bandwidth request to increase bandwidth (e.g., a user's selection or invocation of a Universal Resource locator URL within a web page or a user's specific request to increase bandwidth).

Examples of events which embodiments of the invention can detect that indicate a forthcoming decrease in bandwidth requirements for a communications channel are i) an end of a communications session (e.g., as indicated by a TCP FIN segment at the end of a TCP/IP communications session), ii) the end of content processing (e.g., as indicated by the presence of a content end tag such as </HTML> detected at the end of HTML interpretation of a web page), iii) a user bandwidth request to decrease bandwidth (e.g., a user's specific request to decrease bandwidth), and/or iv) a timeout associated with one of the events that indicated a forthcoming increase in bandwidth requirements for the communications channel.

By way of example, suppose a client communications device equipped with the invention is a wireless access protocol (WAP)-enabled digital wireless telephone that uses code division multiple access (CDMA) communication techniques to communicate over a wireless communications channel to a network communications device such as a wireless base station transceiver (e.g., a wireless or cellular WAP-enabled base station antenna). When the user of such a client communications device activates browser functionality within the device to access data on remote web server computer systems via the wireless communications channel, the device typically transmits and receives data over the wireless communications channel in a bursty or sporadic manner. In other words, the transmission or reception of data by the device is typically not a steady stream of data that demands a constant bandwidth setting. Rather, data communications performed over the communications channel frequently occurs in short or long bursts of data that require fluctuatingly higher and sometimes lower amounts of bandwidth during the bursts, whereas little or no bandwidth may be required when no bursts of data are being transmitted.

Embodiments of the invention can operate to detect events during such processing that indicate an anticipated or forthcoming burst of data that the device will access (i.e., will transmit or receive) over the wireless communications channel. In response to such event(s), embodiments of the invention can dynamically and automatically increase the bandwidth allocated to the communications channel to allow the channel to better accommodate the increased requirements for the transmission of data to or from the device. In addition, embodiments of the invention can also dynamically and automatically detect events that indicate an anticipated decrease in the amount of bandwidth required of the communications channel. For example, embodiments of the invention can detect an event that indicates the end of a former event which previously caused an embodiment of the invention to increase the amount of bandwidth allocated to the communications channel. In such cases, the embodiment of the invention can reduce the amount of bandwidth allocated to the communications channel back to a level or setting that existed prior to the former event which caused the system of the invention to raise the bandwidth setting for the channel in the first place.

In the example of a wireless client communications device using a CDMA communications channel, embodiments of the invention can cause the client communications device to obtain increased bandwidth for the communications channel by, for example, negotiating with a network communications device such as the wireless base station transceiver which is equipped with a bandwidth allocator process that can increase or decrease the amount of bandwidth provided to the communications channel in use by the client communications device operating the processing of this invention. Upon such a negotiation, the network communications device might, perhaps, provide or otherwise allocate additional frequency codes and/or frequency channels to the client communications device, or might allow the device to transmit at a higher power level, to allow the client communications device to transmit and receive higher volumes of data to and from the base station transceiver. If the wireless client communications device uses another wireless communications technology such as, for example, time division multiple access (TDMA), the network communications device (i.e., the base station transceiver) might increase or decrease bandwidth allocated to a communications channel on behalf of the client communications device by increasing or decreasing an amount of transmission time slots on the communications channel for which the client communications device can use to perform data (or voice, etc.) communications. In a non-wireless environment, a computer system equipped with the invention can cause a bandwidth negotiator process to use a bandwidth reservation protocol such as RSVP to adjust bandwidth allocated to the communications channel in response to detecting the events as explained according to this invention.

FIG. 1 illustrates a communications environment 100 which is suitable for use in explaining the operation of example embodiments of the invention. The communications environment 100 comprises a network 110 which represents any type of communications network such as a wireless phone or data network (e.g., CDMA or TDMA network), a computer network such as a Local or Wide Area Network (LAN or WAN), intranet, extranet or the Internet. Coupled to the network 110 is a network communications device 150 which represents any type of communications device 150 that can support any type of communications (e.g., voice, data or other types of information transmission) within the network 110. Examples of the network communications device 150 include a network router, switch, gateway, proxy, wireless base station transceiver or the like. The network communications device 150 includes a bandwidth allocator 160 that is capable of controlling an amount of bandwidth allocated to communications channels 170-1 through 170-M that operate between a plurality of client communications devices 120-1 through 120-N. An example of a bandwidth allocator is an RSVP agent operating within a network router or switch in the case of computer network applications of the invention, or, for wireless applications, a process within a wireless base station that controls power or allocates frequencies, frequency codes or time slots in CDMA or TDMA environments.

The client communications devices 120 represent any type of communications devices that can perform communications (e.g., voice, data or other types of communications) with the network communications device 150 using communications channels 170-1 through 170-M. The client communications devices 120 may each be the same type of communications device, or each may be different from the others. This is illustrated in FIG. 1 by the client communications device 120-1 which is a computer system (e.g., personal computer or workstation) coupled via a physical or land-line communications channel 170-1 (e.g., a dial-up connection, an Ethernet or optical connection, or another type of physical connection) to the network communications device 150, whereas the client communications devices 120-2 through 120-N operate via wireless communications channels 170-2 through 170-M (e.g., CDMA or TDMA links) with the network communications device 150.

Preferably, each client communications device 120 is configured with a communications processing mechanism 130 (e.g., a communications application such as web browser software or another type of communications software and/or hardware mechanism) as well as a bandwidth manager 140 that operates in accordance with embodiments of the invention. Only the client communications device 120-N is illustrated in detail in this example. It is to be understood that the other client communications devices 120-1 through 120-N are configured in a similar manner to contain a communications processing mechanism 130 and the bandwidth manager 140 of this invention.

The invention is meant to be general in nature and applicable to all types of communications systems. Furthermore, it is to be understood that embodiments of the invention are not limited to communications that take place between a single network communications device 150 and one or more client communications devices 120. Rather, the invention can be applied between one or more client communications devices 120 and one or more network communications devices 150, or between two or more network communications devices 150, or between two or more client communications devices 120.

According to general operation of embodiments of the invention, the bandwidth manager 140 operating within a client communications device 120 can monitor operations of the communications processing 130 to detect various events (bandwidth related events, browser related events, etc.) that indicate an anticipated change in bandwidth requirements of the communications channel 170 in use by the communications processing 130. In response to the detection of such a bandwidth or browser event, the bandwidth manager 140 can compute or otherwise calculate a new value for a bandwidth setting (e.g., an increase or decrease in bandwidth) of the communications channel 170 based on the detected event and can then adjust a bandwidth characteristic (e.g., its baud rate or other characteristic) of the communications channel 170 according to the new value of the bandwidth setting by performing bandwidth negotiation 175 between the bandwidth manager 140 and a bandwidth allocator 160.

Figure 2:
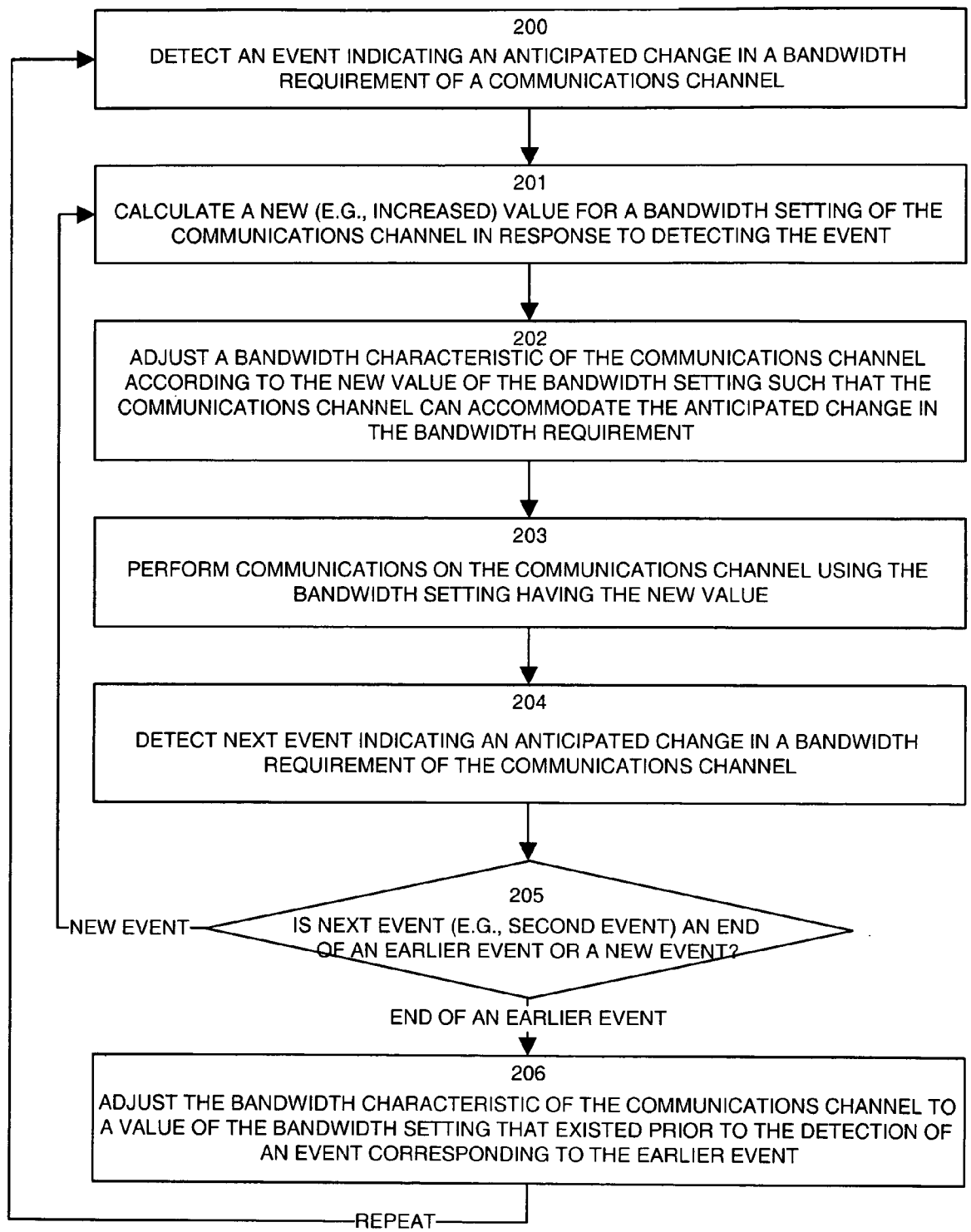
FIG. 2 is a flow chart of processing steps for a method of adjusting usage or allocation of a bandwidth to a data communications channel in accordance with embodiments of the invention.

FIG. 2 shows processing steps performed by a bandwidth manager 140 configured in accordance with example embodiments of the invention.

In step 200, the bandwidth manager 140 detects an event indicating an anticipated change in a bandwidth requirement of the communications channel 170 between the client communications device 120 and the network communications device 150. As an example, consider a situation in which a user (not specifically shown) of the client communications device 120 is viewing information such as a web page within a browser (i.e., via the communications processing 130) on the device 120. The web page may include a link such as a Universal Resource Locator (URL) that the user may select (e.g., via an input mechanism, not specifically shown) to cause the communications device 120 to retrieve another web page from a remote computer system (e.g., a web server) over the wireless communications channel. During the time in which the user is simply viewing the web page within the browser and prior to the user's selection of the URL on that page, the bandwidth requirements of client communications device 120 might be minimal. In other words, little or no data is required to be transferred over the wireless communications channel 170 between a client communications device 120 and the network communications device 150 while the user is simply viewing the page. However, when the user operates the communications processing 130 to select, activate or otherwise invoke the URL, the bandwidth manager 140 can detect this as an event (in step 200 in FIG. 2) that indicates an anticipated change (i.e., an increase in this example) in the bandwidth requirements of the communications channel 170 since the device is about to retrieve data referenced by the URL.

In step 201, the bandwidth manager 140 calculates a new value (e.g., an increase or decrease in an amount) for a bandwidth setting of the communications channel 170 in response to detecting the event in step 200. The bandwidth setting generally indicates a level or amount of bandwidth that the communications device requests for allocation to the communications channel 170. In other words, the bandwidth setting represents an actual usage requirement for setting the bandwidth of the communications channel.

Based on the former example, in step 201, the bandwidth manager 140 might increment a current value of the bandwidth setting by one level or by a predetermined amount of bandwidth units (e.g., Kbps or Mbps). Alternatively, the bandwidth manager 140 might review, parse or otherwise examine the URL to determine if the URL contains a bandwidth determination factor that the bandwidth manager 140 can use to determine or more precisely compute or calculate a specific amount by which to modify the current value of the bandwidth setting.

For example, the bandwidth manger 140 can parse the URL looking for a specific content identifier that identifies what type of data or other information the URL references. Perhaps the URL contains a content identifier such as a specific file extension such as ".JPG" for a JPEG file or ".MPG" for an MPEG encoded file. In such instances, the bandwidth manager 140 can infer that the URL selected by the user references a JPEG or MEPG file and can increase the bandwidth setting by a higher predetermined amount (e.g., two or three levels) based on the bandwidth determination factor since this factor indicates that a large amount of data is to be retrieved in response to the user selecting the URL. Conversely, if the bandwidth manager 140 parses the URL and detects a text file extension such as ".TXT," then the bandwidth manager 140 might increment a bandwidth setting by only a small amount (e.g., one-half of a level) since the URL references a text file for which the communications processing 130 will only require a relatively small amount of bandwidth to retrieve over the communications channel 170.

Next, in step 202, the bandwidth manager 140 adjusts a bandwidth characteristic of the communications channel 170 according to the new value of the bandwidth setting (as calculated in step 201) such that the communications channel 170 can accommodate the anticipated change in the bandwidth requirement. In a preferred embodiment of the invention, the bandwidth manager 140 in step 202 adjusts the bandwidth characteristic of the communications channel 170 by causing the client communications device 120 to perform bandwidth negotiation 175 (FIG. 1) with bandwidth allocator processing 160 that operates within the network communications device 150 that provide the resources that support the communications channel 170. An example of such bandwidth negotiation processing that can occur in step 202 is explained in more detail in a co-pending U.S. patent application entitled "Methods And Apparatus for Controlling Resource Allocation in a Communications Channel", filed Feb. 27, 2001, and being assigned to the same Assignee as the present invention. The entire teachings and contents of this reference patent application are hereby incorporated by reference in their entirety.

In step 203, once the bandwidth manager 140 has caused the bandwidth of the communications channel 170 to be adjusted according to the new value of the bandwidth setting calculated in step 201, the communications processing mechanism 130 operating within the client communications device 120 performs communications on the communications channel 170 using the bandwidth setting having the new value calculated from step 201. The communications processing 130, which may be a browser process or another communications application (i.e., software and/or hardware) thus uses the bandwidth on the communications channel 170 that was increased or decreased according to the processing of step 200 through 202.

In step 204, the bandwidth manager 140 detects the next event indicating an anticipated change in a bandwidth requirement of the communications channel 170. By way of example, if the event that the bandwidth manager 140 detected in step 200 was a user selecting (i.e., clicking) a URL within a web page of a browser operating as the communications processing mechanism 130, then at this point in processing, the browser 130 may now be receiving content such as the web page referenced by the URL over the communications channel 170 (i.e., may now be performing communications on the communications channel 170 using the bandwidth setting having a new value, as per step 203). During loading and interpretation of this new web page, the browser process may encounter, for instance, an embedded URL within the new web page that references other content (e.g., a graphic, image, video or audio data, or another web page) on a remote server computer system (not shown) on the network 110. As is known in the art, when a browser process 130 encounters an embedded URL of this nature, the browser process 130 automatically executes a reference to the embedded URL (i.e., automatically selects or invokes the URL, for example, via HTTP GET, without requiring the user to click the URL) in order to obtain the content to which that embedded URL refers. In such instances, the bandwidth manager 140 detects this processing of the browser 130 as the next event in step 204 indicating another anticipated change (e.g., a further increase) in the bandwidth requirement of the communications channel 170.

Since another event has occurred that indicates an anticipated change in the bandwidth requirements of the communications channel 170, the bandwidth manager 140 will either need to raise or lower the bandwidth setting of the communications channel 170 in order to adjust the bandwidth to better accommodate the increased or decreased communications load on the channel 170 that will happen in the near future as a result of the occurrence of this next event. In other words, the bandwidth manager 140 configured according to embodiments of the invention can detect events and can then make predictions of prospective bandwidth requirements for the communications channel 170 based on those events. As will be explained, certain events will cause the bandwidth manager 140 to raise the bandwidth setting of the communications channel 170 while other events will cause the bandwidth manager 140 to lower the bandwidth setting of the communications channel 170.

In step 205, the bandwidth manager 140 determines if the next event (i.e., a second event detected in step 204) is the end of an earlier event (e.g., the first event detected in step 200) or is a new event unrelated to an earlier event. If the next event is a new event, bandwidth manager processing returns to step 201 to repeat the process of calculating a new value for the bandwidth setting (step 201) and adjusting the bandwidth characteristic of the communications channel (step 202) such that the bandwidth for the communications channel 170 remains set at a more optimal level based on communications activity that is anticipated in response to the event.

In step 205, if the bandwidth manager 140 determines that the next event detected is an end of an earlier event, then processing proceeds to step 206. An end of an earlier event might be a second event that has some relation to a former or first event that the bandwidth manager 140 previously detected.

By way of example, an end of an event might be a bandwidth event related to a browser (e.g., a browser event) that might indicate i) an end of a communications session, ii) and end of content processing, and/or iii) a timeout associated with a first event.

The bandwidth manager 140 can detect an end of a communications session, for example, as a signal on the communications channel 170 between the communications processing mechanism 130 and the network communications device 150 (e.g., a FIN segment of the TCP/IP connection). Alternatively, the bandwidth manager 140 can detect the end of content processing when the bandwidth manager 140 detects that the browser (i.e., communications processing 130) interprets the end of an HTML page via the </HTML> tag. Such an event indicates that the browser 130 has completed content processing of the web page and thus the bandwidth manager 140 can assume that no further embedded URLs or other activities will occur (i.e., will be interpreted) for the web page for which interpretation has just completed. The bandwidth manager 140 can detect a timeout associated with a first event by starting an event timer associated with the first event upon detection of such a first event (e.g., starting an event timer in step 200). When the event timer reaches a predetermined event timeout value, the bandwidth manager 140 can consider this an end of the former or first event which triggered the start of the event timer. By way of example, upon detecting an embedded URL, the bandwidth manager 140 can start a URL event timer for a period of ten seconds. When the event timer reaches the ten second mark, the bandwidth manager 140 can consider this to be a timeout event which indicates the end of the former event associated with detecting the embedded URL (i.e., the event for which the timer was started).

Upon detecting an end of an earlier or first event in step 205, the bandwidth manager 140 performs step 206 to adjust the bandwidth characteristic of the communications channel 170 to a value of the bandwidth setting that existed prior to the detection of an event (e.g., prior to the first event). In other words, certain events are considered a first event for which the bandwidth manager 140 increments or raises the bandwidth setting of the communications channel 170. After a period of time, the bandwidth manager 140 can detect a corresponding second event which relates to the first event and which thus indicates that the bandwidth setting of the communications channel 170 should be decremented or lowered back to the original bandwidth setting prior to the occurrence of the first event.

Upon completion of the processing in step 206, processing of the bandwidth manager 140 returns to step 200 in FIG. 2. The processing in FIG. 2 thus continues such that the bandwidth manager 140 can automatically and dynamically detect bandwidth events and adjust the bandwidth setting of the communications channel 170 such that the communications device 120 is provided with an optimal bandwidth setting with which to use for communications.

Figure 3:
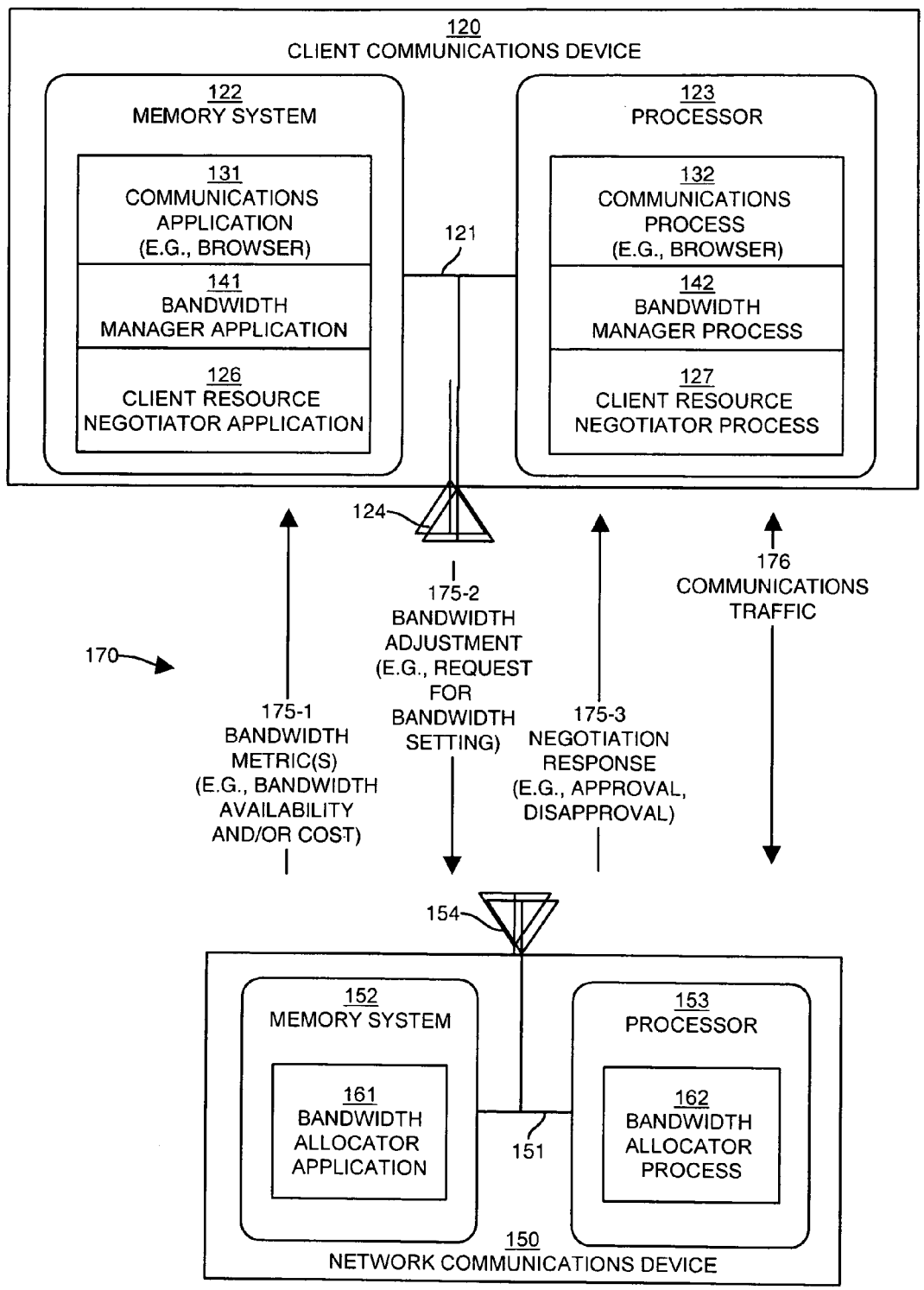
FIG. 3 illustrates a more detailed architecture of client and network data communications devices and shows certain communications that take place between such devices according to embodiments of the invention.

FIG. 3 illustrates an example architecture of a client communications device 120 and a network communications device 150 configured to operate according to one example embodiment of the invention. In addition, FIG. 3 illustrates some of the communications 175, 176 which take place on the communications channel 170 as related to embodiments of the invention.

The client communications device 120 includes an interconnection mechanism 121 which couples a memory system 122, a processor 123 and a communications interface 124. The memory system 122 is encoded with logic instructions and/or data which form a communications application 131 such as a web browser, and which also form a bandwidth manager application 141 configured in accordance with embodiments of the invention, and which further form a client resource negotiator application 126.

The memory system 122 can be any type of memory, computer readable medium or storage system including random access memory (RAM), read only memory (ROM) or any variant thereof or a combination of electronic memory (e.g., RAM, ROM, PROM, etc.) and/or magnetic storage such as a disk drive. The processor 123 can be any type of microprocessor, central processing unit or circuitry which operates within the client communications device 120. The communications interface 124 can be any type of wireless or non-wireless communications interface such as a wireless transceiver, or a network interface such as a modem, Ethernet adapter card, or other type of network interface capable of performing the transmission and reception of data, signals or other digital or analog information. Examples of the client communications device 120 include wireless and non-wireless devices capable of communications such as wireless telephones, personal digital assistants (e.g., palm top computers), laptop computers, desktop computers, workstations or other electronic or computerized communications devices.

Each of the applications 131, 141 and 126 represents software code (e.g., object code) or other instructions which the processor 123 can execute, run, interpret or otherwise perform as a corresponding respective process 132, 142 and 127. As such, when the processor 123 performs logic instructions of the communications application 131, the processor 123 forms the communications process 132, which may be, for example, a web browser process. Examples of a web browser process 132 are Netscape Navigator manufactured by Netscape Communications Corporation and Internet Explorer manufactured by Microsoft Corporation. When the processor 123 performs the bandwidth manager application 141, the processor 123 forms a bandwidth manager process 142 which operates within the client communications device 120 according to the embodiments of the invention as explained herein. When the processor 123 performs the client resource negotiator application 126, the processor 123 forms a client resource negotiator process 127. Example embodiments of the client resource negotiator application 126 and the client resource negotiator process 127 as well as specific details of their operations are explained in the formerly referenced co-pending U.S. patent application entitled "Methods And Apparatus For Controlling Resource Allocation In A Communications Channel." It is to be understood for purposes of this description that the bandwidth manager 140 shown in FIG. 1 is represented as the combination of the bandwidth manager application 141 and the bandwidth manager process 142 in FIG. 3.

The network communications device 150 includes an interconnection mechanism 151 which couples a memory system 152, a processor 153 and a communications interface 154. The memory system 152 is encoded with a bandwidth allocator application 161 which the processor 153 may execute, run, interpret or otherwise perform to create or form the bandwidth allocator process 162. The network communications device 150 may be any type of network based communications device capable of communicating via either wireless or non-wireless techniques with the client communications device 120 via the communications channel 170. Examples of the network communications device 150 include wireless base station transceivers (e.g., using perhaps WAP-enabled CDMA or TDMA or other wireless communications technologies), cell phone antennas and/or any type of wireless or non-wireless router, switch, hub, proxy, gateway or other type of computer or telephony network communications device that resides within a network which can transport data between the client communications device 120 and other devices, computer systems or the like.

The bandwidth allocator process 162 operates within the network communications device 150 and is capable of adjusting an amount of bandwidth (and possibly other resources) allocated to a particular communications channel 170 on behalf of a particular client communications device 120. Certain details of the operation of the bandwidth allocator process 162 are explained in more detail within the formerly referenced co-pending U.S. patent application entitled "Methods And Apparatus For Controlling Resource Allocation In A Communications Channel" in which the bandwidth allocator process 162 is referred to as a resource allocator process.

As illustrated in FIG. 3, during operation of embodiments of the present invention, once the bandwidth manager process 142 calculates a new value for a bandwidth setting of the communications channel 170 in response to the detection of events (as explained, for example, with respect to the processing in FIG. 2), the bandwidth manager process 142 can adjust the bandwidth characteristic of the communications channel 170 by passing (not specifically shown) the bandwidth setting to the client resource negotiator process 127 (i.e., as an actual resource setting), which operates as explained in the co-pending U.S. patent application entitled "Methods And Apparatus For Controlling Resource Allocation in a Communications Channel."

Generally, for purposes of this description, the client resource negotiator process 127 receives bandwidth metrics 175-1 from the bandwidth allocator process 162 which might indicate, for example, bandwidth level availability and/or costs per unit of time of various available bandwidth settings on the communications channel 170. Such information allows the client resource negotiator process 127 to calculate a new value for current bandwidth setting (as explained in the formerly referenced co-pending patent application) based upon the bandwidth setting received from the bandwidth manager process 142. The client resource negotiator process 127 then provides the bandwidth adjustment 175-2, such as a request for a bandwidth setting (i.e., a current resource setting having a new value based on the bandwidth setting as calculated by the bandwidth manager process 142 of this invention) to the bandwidth allocator process 162.

Assuming that the bandwidth allocator process 162 is capable of adjusting the bandwidth of the communications channel 170 as requested, the bandwidth allocator process 162 provides a negotiation response 175-3 back to the client resource negotiator process 127 indicating that the bandwidth of the communications channel 170 has been set as requested. The communications traffic signal 176 in FIG. 3 represents data, voice or other communications that take place between the communications process 132 (e.g., a browser) the network communications device 150 (and communications which take place indirectly with one or more servers or other devices located elsewhere within the network 110 (FIG. 1).

As illustrated in FIG. 3 then, embodiments of the invention are able to monitor the communications traffic 176 and processing operations of the communications process 132 to detect various events as explained herein. In response, the bandwidth manager process 142 of embodiments of the invention can calculate the new bandwidth setting and can provide this value to the client resource negotiator process 127. The client resource negotiator process 127 can then use the new value of the bandwidth setting as received from the bandwidth manager process 142 of this invention to calculate a new current resource (i.e., bandwidth) setting with which the bandwidth allocator process 162 can use to adjust the bandwidth allocated to the communications channel 170 on behalf of the client communications device 120.

Figure 4:
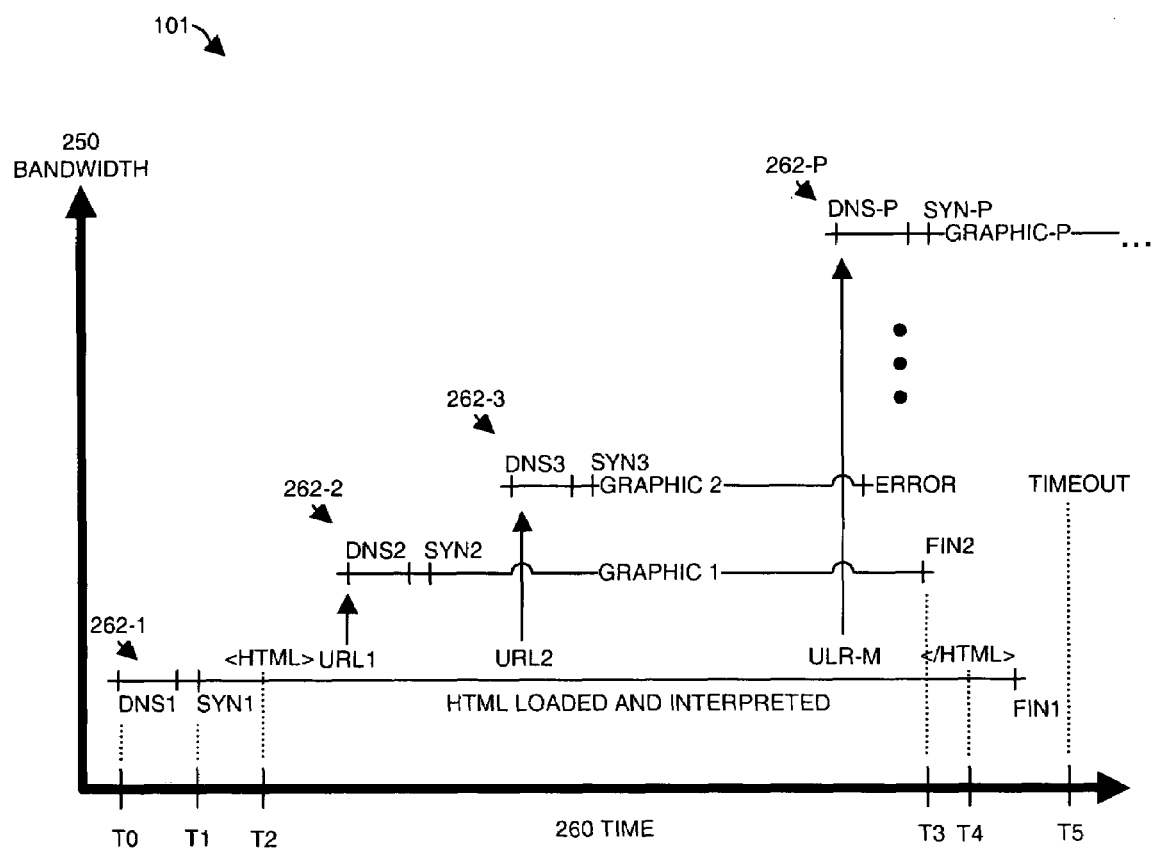
FIG. 4 is a graph illustrating an example of the relationships between browser activity and communications processing which causes bandwidth adjustments which embodiments of the invention can make in response to detecting such events.

FIG. 4 shows a graph 101 of the relationship between bandwidth allocated to a particular communications channel 170 on behalf of a client communications device 120 over a period of time in which various processing activities and events (e.g., bandwidth events, browser events or other events) take place as detected by embodiments of the invention.

In particular, the graph 101 shows various communications processing activities 262-1 through 262-P that occur (i.e., as performed by the communications process 132) during the time shown by the timeline 260. During the processing of the activities 262, various events T0 through T5 occur at various times on the timeline 260. The bandwidth manager process 142 configured according to embodiments of the invention can monitor the processing of activities 262 as well as the communications traffic 176 (FIG. 3) to detect the occurrence of some or all of the events T0 through T5. One purpose of illustrating and explaining each of the different events T0 through T5 with respect to FIG. 4 is to illustrate the different types of events that a bandwidth manager process 142 configured according to embodiments of the invention can detect. This is not to say that a bandwidth manager process 142 configured according to the invention detects and responds to all or only these types of events T1 through T5. Rather, the graph 101 is illustrative of examples of different types of events that can occur to cause an adjustment in a bandwidth setting of the communications channel 170. Other events not shown here are contemplated as being within the scope of this invention.

In this specific example, the activity 262-1 begins, for example, when a user of the client communications device 120 operates the communications process 132, which may be web browser, to select a URL (not specifically shown) within the browser 132 in order to retrieve a web page (also not specifically shown) referenced by the URL. This initial or first event T0 is detected by the bandwidth manager process 142 and processing proceeds according to embodiments of the invention as explained with respect to FIG. 2 to adjust bandwidth in anticipation of data which is to be received by the communications process 132 via the communications channel 170. In other words, the activity 262-1 represents the processing performed by the communications process 132 in response to a user selection of the URL in order for the communications process 132 to retrieve a web page from a web server on the network 110.

Specifically, as illustrated by the detail related to the activity 262-1, upon a user selecting a URL, the communications process 132 first performs a domain name service (DNS) lookup (shown by the segment of activity 262-1 labeled DNS1) for a web server address that can serve or otherwise provide the web page referenced by the URL. The bandwidth manager process 142 may detect the first event T0 by monitoring the communications traffic 176 for a packet of information that the communications process 132 uses to resolve the web server address. In other words, the bandwidth manager process 142 may detect the beginning of the DNS communications session (e.g., via detection of a synchronize or SYN segment of a TCP/IP connection, or via detection of an address of a name server as a destination address in a packet) required to perform the name resolution of the URL server address for the activity 262-1. In response, the bandwidth manager process 142 can raise the bandwidth setting for the communications channel 170 as previously explained.

Once the address for the web server is resolved, the communications process 132 then establishes another TCP/IP connection to the web server containing the web page to be retrieved. This is represented by event T1, which the bandwidth manager process 142 may detect as synchronize (SYN) segment of a new TCP/IP connection.

Once the web server (not shown in figures) located on the network 110 begins providing web page content, data or other information back to the communications process 132 via the communications channel 170 (specifically, as communications traffic 176 in FIG. 3), the communications process 132 begins content processing (e.g., interpretation) on the web page, as indicated at event T2. Typically, a web page begins with a known flag such as <HTML>. The bandwidth manager process 142 can thus detect event T2 by monitoring the communications traffic 176 for the occurrence of a flag indicating the beginning of a web page to be processed (i.e., to be interpreted) by the communications process 132. Alternatively, the bandwidth manager process 142 can utilize an application programming interface (e.g., a browser API, not specifically shown) to the communications process 132 to detect or otherwise determine when the communications process 132 begins content processing.

To this end, events T0 through T2 each represent an example of an event which the bandwidth manager process 142 can detect, for example, in step 200 of the processing in FIG. 2. As a result of the detection of any or all or a combination of events T0 through T2, the bandwidth manager process 142 can perform as previously explained to calculate a new bandwidth setting and then adjust the bandwidth of a communications channel 170 such that the client communications device 120 will be able to handle the increased transmission load experienced on the communications channel 170 in order to retrieve the web page or other information referenced by the URL as illustrated by the activity 262-1 in FIG. 4. In other words, events T0 through T2 represent bandwidth events or browser events for which the bandwidth manager process 142 detects and calculates an increased bandwidth setting for the communications channel 170.

Referring again to FIG. 4, activity 262-2 represents the occurrence of an embedded URL within the HTML contents of the web page being loaded into the communications device 120 during operation of the communications process 132 as it processes activity 262-1. This is shown by the label URL1 in FIG. 4. As previously noted, when a browser such as communications process 132 encounters an embedded URL within a web page (e.g., within the web page being loaded during the processing of activity 262-1), the browser 132 automatically invokes a reference to the embedded URL in order to retrieve the data referenced by that URL. This is illustrated in FIG. 4 since activity 262-2 occurs concurrently with, and in parallel to the activity 262-1. While not shown in FIG. 4 due to drawing space limitations, each of the events T0 through T2 that occurred for activity 262-1 occur in a similar manner for activity 262-2. That is, activity 262-2 causes the communications process 132 to establish a communications session with a domain name server within the network 110 in order to resolve the network address of a web server referenced by the embedded URL1. Thereafter, the communications process 132 establishes another concurrent communications session shown by SYN2 in FIG. 4 in order for the communications process 132 to retrieve the data referenced by the URL1. In this example, that data is a graphic image labeled as GRAPHIC1.

Any one or all of the events that occur at the beginning of the activity 262-2 are detectable by the bandwidth manager process 142. In response, as previously explained, the bandwidth manager process 142 is able to calculate a new value (e.g., an even higher value) for the bandwidth setting of the communications channel 170 and is able to have the client resource negotiator process 127 negotiate with the bandwidth allocator process 162 in order to establish an increased allocation of bandwidth for the communications channel 170 in order to accommodate the increased amount of data that it to be transferred over this channel 170.

As the communications process 132 further performs content processing of a web page as shown by activity 262-1, the communications process 132 encounters another embedded URL2 within the web page. This causes the communications process 132 to begin a third concurrent activity 262-3. During the start of the occurrence of the activity 262-3, the bandwidth manager process 142 is able to detect one or more of a similar set of events T0 through T2, as were detected for activities 262-1 and 262-2. Accordingly, activity 262-3 causes the bandwidth manager process 142 configured according to embodiments of this invention to further raise or increase the bandwidth setting of the communications channel 170. This process repeats for each activity that is spawned by the communications process 132 during interpretation of the web page in activity 262-1, These successive bandwidth increases are illustrated in the graph 101 in FIG. 4 since each additional activity 262 which the communications process 132 activates in a concurrent manner causes a corresponding increase in bandwidth 250. This process continues for each activity 262-1 through 262-P which the communications process 132 processes and which causes one or more bandwidth or browser events to be detected by the bandwidth manager process 142.

Turning attention now to the events T3 through T5, these events represent second events or events which corresponds to an end of an earlier event T0 through T2. More specifically, events T3 through T5 represent events that the bandwidth manager process 142 can detect in order to lower or decrease the bandwidth setting of the communications channel 170 due to a decrease in the anticipated bandwidth requirements for the communications channel 170.

By way of example, event T3 represents the end of the communications session for the activity 262-2. In other words, the communications process 132 has completely retrieved the data for the image GRAPHIC1 and hence terminates the TCP/IP communications session for activity 262-2. The bandwidth manager process 142 can detect the event T3 by detecting a finish segment (FIN or RST for reset) of the TCP/IP communications session that was formerly established to handle the data communications requirements of activity 262-2.

As another example, event T4 represents the end of content processing for the activity 262-1 and thus accordingly represents a decrease in anticipated bandwidth requirements of the communications channel 170 since the communications process 132 has completely retrieved the web page associated with the activity 262-1. The bandwidth manager process 142 can detect the event T4, for example, by detecting the flag </HTML> within the communications traffic 176 on the communications channel 170 which typically occurs to indicate the end of a web page.

Event T5 represents a timeout event associated with the first bandwidth event for activity 262-3. The activity 262-3 represents the processing required by the communications process 132 to retrieve another image (called GRAPHIC2 in this example). However, in this example, there was an error in retrieving GRAPIHC2 and thus the communications process 132 never fully completes activity 262-3. Accordingly, it is difficult for the bandwidth manager process 142 of this invention to detect the end of the communications session (e.g., an event like T3) associated with activity 262-3. To solve this problem, this example embodiment of the bandwidth manager process 142 begins an event timer upon the occurrence of certain events. In particular, events that occur that indicate an increased requirement in anticipated bandwidth for the communications channel 170 can have an associated event timer which the bandwidth manager process 142 tracks (i.e., increments over time) during the processing of the activity 262 associated with the event.

As a specific example, with respect to activity 262-3, the bandwidth manager process 142 can start an event timer (not specifically shown) at the beginning of the event (not specifically labeled in FIG. 4, through corresponding to the location labeled URL2) which indicates the beginning of activity 262-3. As the bandwidth manager process 142 continues to operate, it will continue to increment the event timer associated with the event 262-3. If an event timer exceeds a predetermined value of time, the bandwidth manager process 142 can consider this itself to be an event for which to make a bandwidth adjustment. With respect to the example activity 262-3, since there was an error in transferring the data associated with this activity 262-3, and thus the communications session associated with the activity 262-3 is never officially terminated by the communications process 132 (e.g., no FIN or RST signal is transmitted on the communications channel 170), then when the event timer associated with the activity 262-3 reaches the predetermined value, the bandwidth manager process 142 detects event T5 as a timeout event. This causes the bandwidth manager process 142 to recalculate the bandwidth setting to a lower value since it may be assumed that the communications session for activity 262-3 has experienced an error condition and is thus considered to be timed-out.

Is to be understood that the example events T0 through T5 in FIG. 4 are meant to be illustrative of certain events that a bandwidth manager process 142 configured according to embodiments of this invention can detect in order to make bandwidth adjustments to the bandwidth of the communications channel 170. As noted above, particular implementations of a bandwidth manager process 142 of this invention can be configured to detect some, one, all or a combination of the events T1 through T5 or other events in order to make bandwidth adjustments. As an example, a bandwidth manager process 142 configured according to one embodiment of the invention can detect one type of bandwidth event indicating the beginning of the communications session in order to increase the bandwidth adjustment in anticipation of the transmission of data using that session, and may be further configured to detect the end of a communications session event and/or a timeout event in order to reduce a bandwidth adjustment of the communications channel 170 when the session has ended.

Other events not specifically shown in FIG. 4 might be the appearance (i.e., the loading) or the initiation (i.e., the start of interpretation) of an applet such as a Java applet by the device 120. An applet with the communications process 132 accesses might further utilize the communications channel 170 for further communications and thus the bandwidth manager process 142 of this invention might detect the presence of an applet (i.e., either within the communications process 132, or as the applet is loaded via the communications channel 170) and may boost bandwidth accordingly.

Figure 5:
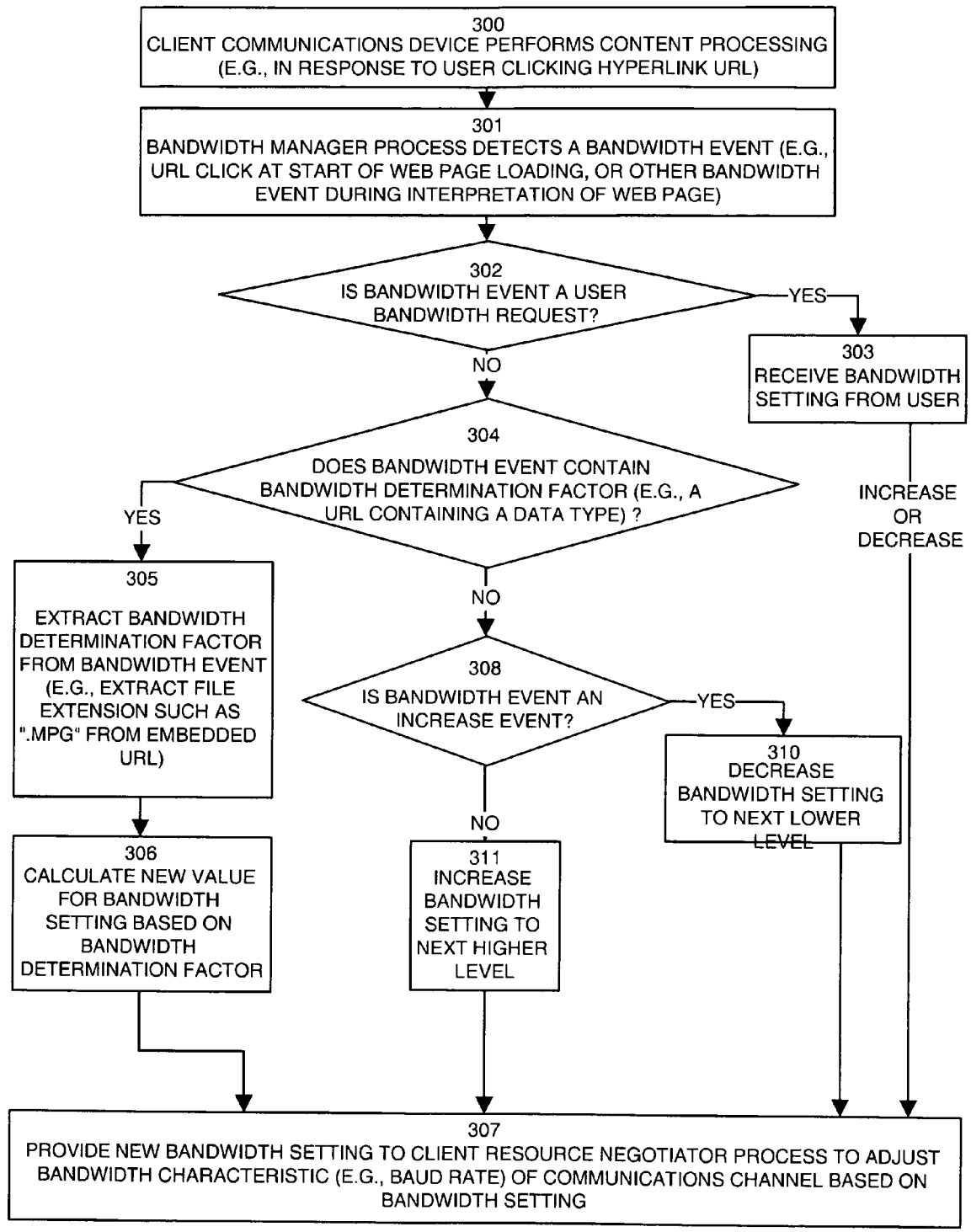
FIG. 5 is a more detailed flow chart illustrating an implementation of one method embodiment of the invention which adjusts bandwidth allocated to a data communications channel in response to certain events.

FIG. 5 is a flow chart of processing steps which show a more detailed embodiment of the client communications device 120 configured with a bandwidth manager process 142 configured according to one example embodiment of the invention. The flow chart of processing steps in FIG. 5 also illustrates an example arrangement of logic instructions which exist within a bandwidth manager application 141 as encoded within the computer readable medium such as the memory system 122 and FIG. 3.

In step 300, the client communications device performs content processing on content such as a Web page received over the communications channel 170, for example, in response to a user of the client communications device 120 clicking on a hyper linked URL.

In response, in step 301, the bandwidth manager process 142 detects a bandwidth event which, in this example, is the URL click from a user input device such as a mouse, button or other mechanism that occurs to start the web page loading. Alternatively, the bandwidth manager process 142 may detect another bandwidth event during interpretation of the web page such as the beginning of a communications session as previously explained.

In step 302, the bandwidth manager process 142 determines if the bandwidth event (detected in step 301) is a user bandwidth request. In this particular embodiment, a user of the client communications device 120 is able to provide a specific user bandwidth request such as, for example, by selecting a bandwidth increase button (not specifically shown) or other input device on the client communications device 120 in order to provide a request for more bandwidth on the communications channel 170. In such cases, the bandwidth manager process 142 does not have to anticipate the requirement for more bandwidth (e.g., via communications monitoring) since the user specifically makes this requirement known to the bandwidth manager process 142 by manually providing the user bandwidth request. Assume for this example that the bandwidth event that the bandwidth manager process 142 detects in step 301 is not a user bandwidth request and thus processing proceeds to step 304. Processing of user bandwidth requests will be explained in more detail shortly.

In step 304, the bandwidth manager process 142 determines if the bandwidth event contains a bandwidth determination factor. In this embodiment, the bandwidth manager 142 not only can detect certain types of events, but can also analyze bandwidth event information to determine, based on such information, a more specific nature of the event and is thus able to more accurately predict or calculate a bandwidth setting for the communications channel 170. By way of example, suppose a URL which a user of the client communications device 120 selects or otherwise invokes contains a reference to file to be retrieved by the communications process 132 having a name such as "FILE1.MPG." In this example, the file extension ".MPG" indicates that the file is an MPEG encoded video file. Such files tend to contain a large amounts of data as compared to files of other data types, such as text or HTML only files. As such, in step 304, if the bandwidth manager process 142 determines that the bandwidth event contains such a bandwidth determination factor, processing proceeds to step 305.

In step 305, the bandwidth manager process 142 extracts the bandwidth determination factor from the bandwidth event information (e.g., from the string representing the URL in this example). Using the previous example of bandwidth event information as an example, in step 305, the bandwidth manager process 142 extracts the MPEG file extension ".MPG" from the URL information associated with the bandwidth event (i.e., associated with the URL string for which the user selected to trigger the bandwidth event as detected by the bandwidth manager process 142 in step 301).

Next, in step 306, the bandwidth manager process 142 calculates the new value for the bandwidth setting of the communications channel 170 based on the bandwidth determination factor extracted in step 305. Such a calculation might be performed, for example, by consulting a table listing various bandwidth determination factors such as file extension types along with corresponding preferred bandwidth settings for such data types. As such, for file extensions such as ".txt" and ."html" indicating the data is text or HTML data, the bandwidth manager process 142 can use the bandwidth determination factor (e.g., the file extension of the URL) to determine a proper bandwidth setting for the communications channel.

In another alternative, the bandwidth determination factor might be a known address of a remote computer system which a URL references. For example, the bandwidth manager process 142 can be configured with known addresses of video or audio servers. When the bandwidth manager process detects a bandwidth event that references one of such servers (via detection of a bandwidth event containing the address of one of such servers as the bandwidth determination factor), then the bandwidth manager process can consult a table for a proper bandwidth setting to use for communications with that server over the communications channel 170.

Next, in step 307, the bandwidth manager process 142 provides the new bandwidth setting (based on the calculation from step 306) to the client resource negotiator process 127 in order for that process 127 to adjust a bandwidth characteristic of the communications channel 170 based upon the bandwidth setting. The bandwidth characteristic that the client resource negotiator process 127 adjusts in step 307 may be, for example, a baud rate or bit rate used for transmission of data on the communications channel 170.

Returning attention now back to step 304, if the bandwidth event does not contain a bandwidth determination factor, processing proceeds to step 308. In step 308, the bandwidth manager process 142 determines if the bandwidth event is a bandwidth increase event. In other words, in step 308, the bandwidth manager process 142 determines if the bandwidth event detected in step 301 is one of the events such as one of events T0 through T2 as discussed above that require a bandwidth increase with respect to FIG. 4. If the event is increase event, processing proceeds to step 310.

In step 310, the bandwidth manager process 142 increases the bandwidth setting to a next higher level. In this example embodiment then, bandwidth events that are not specific user bandwidth requests and that do not contain bandwidth determination factors, but that do require an increase in bandwidth adjustment (e.g., an event such as the start of the communications session), cause the bandwidth manager process 142 to increment the bandwidth setting to a next higher level. Thereafter, processing proceeds to step 307 which, as explained above, provides a new bandwidth setting to the client resource negotiator process 127 which causes an adjustment (an increase in this example) in the bandwidth of the communications channel 170.

Returning attention back to step 308, if the bandwidth event is not an event for which bandwidth is increased, processing proceeds to step 309 in which the bandwidth manager process 142 decreases the bandwidth setting to the next lower level. That is, a bandwidth event for which no bandwidth determination factor is present and which is not a bandwidth increase event must be a bandwidth decrease event and causes the bandwidth manager process 142 to lower the bandwidth setting by one level so as to decrease the bandwidth of the communications channel 170.

Returning attention now back to step 302, if the bandwidth event is a user bandwidth request (i.e., a user has specifically manipulated a function of the client communications device 120, such as by depressing a bandwidth increase or decrease button), processing proceeds to step 303 in which the bandwidth manager process 142 receives a bandwidth setting from the user of the client communications device 120.

As an example, the bandwidth manager process 142 may prompt the user to enter a particular desired bandwidth or a bandwidth level or amount or increment or decrement by which to increase or decrease the bandwidth of the communications channel 170. This aspect of embodiments of the invention allows a user, for example, who is experiencing communications difficulties such as static, interference or errors on the communications channel 172, to increase the bandwidth on the communications channel 170 by specifically indicating to the client communications device 120 that the user desires to increase the bandwidth to the next bandwidth level.

In step 303 then, the bandwidth manager process 142 prompts the user for a new bandwidth setting and receives the bandwidth setting from the user. Processing then proceeds to step 307 which, as explained above, provides the new bandwidth setting to the client resource negotiator process 127 which operates to adjust the bandwidth characteristic of the communications channel based upon the bandwidth setting.

In this manner, embodiments of the invention for which the processing is performed as illustrated in FIG. 5 allow a bandwidth manager process 142 to automatically and dynamically adjust bandwidth allocated to a communications channel 170 on behalf of the client communications device 120 in response to the detection of certain types of events which warrant or otherwise merit an increase or decrease in bandwidth based upon an anticipated change in bandwidth requirements of the communications channel 170 in use by the device 120.

It is to be understood that the bandwidth manager process 142 of this invention can be configured or programmed to detect many different types of events that have a requirement for the utilization of bandwidth on the communications channel 170. Those skilled in the art will appreciate that the events discussed in detail here do not represent every possible event that a communications process 132 can perform or encounter that will require the use of bandwidth on the communications channel. Rather, the events discussed here are meant to be illustrative of examples of the types of bandwidth or browser or other events detectable by embodiments of the invention. Such embodiments are configurable to detect other such events as well.

The foregoing description of embodiments of the invention are not intended to be limiting. Rather, any limitations to embodiments of the invention are presented in the following claims.

What is claimed is:

1. In a communications device, the communications device being a browser enabled device, a method for dynamically adjusting bandwidth of a communications channel, the method comprising the steps of:

detecting a first event indicating a first anticipated change in a bandwidth requirement of the communications channel, the first event indicating a browser event requiring a browser in the communications device to access content from a remote computer system;

calculating a first new value for a bandwidth setting of the communications channel in response to detecting the first event, the first new value of the bandwidth setting of the communications channel being calculated to accommodate additional bandwidth used to receive the content from the remote computer system;

adjusting a bandwidth characteristic of the communications channel according to the first new value of the bandwidth setting such that communications channel can accommodate the first anticipated change in the bandwidth requirement;

detecting a second event indicating a second anticipated change in the bandwidth requirement of a communications channel;

calculating a second new value for a bandwidth setting of the communications channel in response to detecting the second event; and further adjusting the bandwidth characteristic of the communications channel according to the second new value of the bandwidth setting such that communications channel accommodates the second anticipated change in the bandwidth requirement.

2. The method of claim 1 further comprising the steps of:
performing communications on the communications channel using the bandwidth setting having the first new value;
detecting an end of the first event indicating that the first anticipated change in a bandwidth requirement of a communications channel is complete; and
adjusting the bandwidth characteristic of the communications channel to an original value of the bandwidth setting that existed prior to the detection of the first event.

3. The method of claim 1 wherein the step of calculating a first new value for a bandwidth setting of the communications channel in response to detecting the first event comprises the steps of:
determining if the bandwidth event contains a bandwidth determination factor, and if the bandwidth event contains a bandwidth determination factor:
  i) extracting the bandwidth determination factor from the bandwidth event; and
  ii) calculating the new value for the bandwidth setting based on the bandwidth determination factor;
and if the bandwidth event contains a bandwidth determination factor, adjusting the bandwidth setting to at least one of a next higher level and a next lower level based on the bandwidth event.

4. The method of claim 1 wherein:
the first bandwidth event indicates a first increased anticipated change in the bandwidth requirement of the communications channel and the second bandwidth event indicates a second increased anticipated change in the bandwidth requirements of the communications channel; and
wherein the first new value of the bandwidth setting is greater than a former value of the bandwidth setting and the second new value of the bandwidth setting is greater than the first new value of the bandwidth setting, such that the bandwidth characteristic of the communications channel is dynamically adjusted to raise the bandwidth of the communications channel in response to the first and second bandwidth events.

5. The method of claim 4 wherein at least one of the first bandwidth event and the second bandwidth event indicate a browser event for at least one of:
  i) a beginning of a communications session;
  ii) a beginning of content processing; and
  iii) a user bandwidth request for additional bandwidth on the communications channel.

6. The method of claim 1 wherein:
the first bandwidth event indicates an increased anticipated change in the bandwidth requirement of the communications channel and the second bandwidth event indicates a decreased anticipated change in the bandwidth requirements of the communications channel; and
wherein the first new value of the bandwidth setting is greater than a former value of the bandwidth setting and the second new value of the bandwidth setting is less than the first new value of the bandwidth setting, such that:
  i) the bandwidth characteristic of the communications channel is dynamically adjusted to raise the bandwidth of the communications channel in response to the first bandwidth event; and
  ii) the bandwidth characteristic of the communications channel is dynamically adjusted to lower the bandwidth of the communications channel in response to the second bandwidth event.

7. The method of claim 6 wherein the second bandwidth event indicates an end of the first bandwidth event.

8. The method of claim 6 wherein the first bandwidth event indicates a browser event for at least one of:
  i) a beginning of a communications session;
  ii) a beginning of content processing;
and wherein the second bandwidth event indicates a browser event for at least one of:
  i) an end of a communications session;
  ii) an end of content processing; and
  iii) a timeout associated with an earlier bandwidth event.

9. The method of claim 1 wherein the step of detecting the first event includes parsing content accessed by the browser to detect a content reference within the content.

10. The method of claim 1 wherein the step of detecting the first event detects a communications session message generated by the browser.

11. The method of claim 1 wherein the communications device is a wireless device and the communications channel is a wireless communications channel and wherein the bandwidth characteristic of the communications channel is at least one of:
  i) a timeslot allocation for a time division multiple access protocol operating on the communications channel;
  ii) at least one frequency for a code division multiple access protocol operating on the communications channel; and
  iii) at least one frequency code for a code division multiple access protocol operating on the communications channel.

12. A browser-enabled communications device comprising:
an communications interface;
a memory system;
a processor; and
an interconnection mechanism coupling the communications interface, the memory system, and the processor;
wherein the memory system is configured with a bandwidth manager application, that when performed on the processor, provides a bandwidth manager process that dynamically adjusts bandwidth of a communications channel operating on the communications interface by performing the operations of:
detecting a first event indicating a first anticipated change in a bandwidth requirement of the communications channel, the first event indicating a browser event requiring a browser in the communications device to access content from a remote computer system;
calculating a first new value for a bandwidth setting of the communications channel in response to detecting the first event, the first new value of the bandwidth setting of the communications channel being calculated to accommodate additional bandwidth used to receive the content from the remote computer system;
adjusting a bandwidth characteristic of the communications channel according to the first new value of the bandwidth setting such that communications channel can accommodate the first anticipated change in the bandwidth requirement;
detecting a second event indicating a second anticipated change in the bandwidth requirement of a communications channel;

calculating a second new value for a bandwidth setting of the communications channel in response to detecting the second event; and further adjusting the bandwidth characteristic of the communications channel according to the second new value of the bandwidth setting such that communications channel accommodates the second anticipated change in the bandwidth requirement.

13. The communications device of claim 12 wherein the bandwidth manager process further performs the operations of:

performing communications on the communications channel using the bandwidth setting having the first new value;

detecting an end of the first event indicating that the first anticipated change in a bandwidth requirement of a communications channel is complete; and adjusting the bandwidth characteristic of the communications channel to an original value of the bandwidth setting that existed prior to the detection of the first event.

14. The communications device of claim 12 wherein when the bandwidth manager process performs the operation of calculating a first new value for a bandwidth setting of the communications channel in response to detecting the first event, the bandwidth manager process further performs the operations of:

determining if the bandwidth event contains a bandwidth determination factor, and if the bandwidth event contains a bandwidth determination factor:
  i) extracting the bandwidth determination factor from the bandwidth event; and
  ii) calculating the new value for the bandwidth setting based on the bandwidth determination factor;

and if the bandwidth event contains a bandwidth determination factor, adjusting the bandwidth setting to at least one of a next higher level and a next lower level based on the bandwidth event.

15. The communications device of claim 14 wherein the first bandwidth event indicates a first increased anticipated change in the bandwidth requirement of the communications channel and the second bandwidth event indicates a second increased anticipated change in the bandwidth requirements of the communications channel; and wherein the first new value of the bandwidth setting is greater than a former value of the bandwidth setting and the second new value of the bandwidth setting is greater than the first new value of the bandwidth setting, such that the bandwidth manager process dynamically adjusts the bandwidth characteristic of the communications channel to raise the bandwidth of the communications channel in response to the first and second bandwidth events.

16. The communications device of claim 15 wherein at least one of the first bandwidth event and the second bandwidth event indicate a browser event for at least one of:
  i) a beginning of a communications session;
  ii) a beginning of content processing; and
  iii) a user bandwidth request for additional bandwidth on the communications channel.

17. The communications device of claim 12 wherein:

the first bandwidth event indicates an increased anticipated change in the bandwidth requirement of the communications channel and the second bandwidth event indicates a decreased anticipated change in the bandwidth requirements of the communications channel; and wherein the first new value of the bandwidth setting is greater than a former value of the bandwidth setting and the second new value of the bandwidth setting is less than the first new value of the bandwidth setting, such that:
  i) the bandwidth manager process dynamically adjusts the bandwidth characteristic of the communications channel to raise the bandwidth of the communications channel in response to the first bandwidth event; and
  ii) the bandwidth manager process dynamically adjusts the bandwidth characteristic of the communications channel to lower the bandwidth of the communications channel in response to the second bandwidth event.

18. The communications device of claim 17 wherein the second bandwidth event indicates an end of the first bandwidth event.

19. The communications device of claim 17 wherein the first bandwidth event indicates a browser event for at least one of:
  i) a beginning of a communications session;
  ii) a beginning of content processing;
and wherein the second bandwidth event indicates a browser event for at least one of:
  i) an end of a communications session;
  ii) an end of content processing; and
  iii) a timeout associated with an earlier bandwidth event.

20. The communications device of claim 12 wherein when the bandwidth manager process performs the operation of detecting the first event, the bandwidth manager process performs the operation parsing content accessed by the browser to detect a content reference within the content.

21. The communications device of claim 12 wherein when the bandwidth manager process performs the operation of detecting the first event, the bandwidth manager process detects a communications session message generated by the browser.

22. The communications device of claim 12 wherein the communications device is a wireless device and the communications channel is a wireless communications channel and wherein the bandwidth characteristic of the communications channel is at least one of:
  i) a timeslot allocation for a time division multiple access protocol operating on the communications channel;
  ii) at least one frequency for a code division multiple access protocol operating on the communications channel; and
  ii) at least one frequency code for a code division multiple access protocol operating on the communications channel.

23. A computer program product having a computer-readable medium including bandwidth manager application computer program logic encoded thereon for adjusting bandwidth of a communications channel, such that the computer program logic, when performed on at least one processor within a browser-enabled communications device, causes the at least one processor to perform the operations of:

detecting a first event indicating a first anticipated change in a bandwidth requirement of the communications channel, the first event indicating a browser event requiring a browser in the communications device to access content from a remote computer system;

calculating a first new value for a bandwidth setting of the communications channel in response to detecting the first event, the first new value of the bandwidth setting of the communications channel being calculated to accommodate additional bandwidth used to receive the content from the remote computer system;

adjusting a bandwidth characteristic of the communications channel according to the first new value of the bandwidth setting such that communications channel can accommodate the first anticipated change in the bandwidth requirement;

detecting a second event indicating a second anticipated change in the bandwidth requirement of a communications channel;

calculating a second new value for a bandwidth setting of the communications channel in response to detecting the second event; and further adjusting the bandwidth characteristic of the communications channel according to the second new value of the bandwidth setting such that communications channel accommodates the second anticipated change in the bandwidth requirement.

24. A browser-enabled communications device comprising:

an communications interface;

a memory system;

a processor; and an interconnection mechanism coupling the communications interface, the memory system, and the processor;

wherein the memory system is configured with a bandwidth manager application, that when performed on the processor, provides a means to dynamically adjust bandwidth of a communications channel operating on the communications interface, such means including:

means for detecting a first event indicating a first anticipated change in a bandwidth requirement of the communications channel, the first event indicating a browser event requiring a browser in the communications device to access content from a remote computer system;

means for calculating a first new value for a bandwidth setting of the communications channel in response to detecting the first event, the first new value of the bandwidth setting of the communications channel being calculated to accommodate additional bandwidth used to receive the content from the remote computer system;

means for adjusting a bandwidth characteristic of the communications channel according to the first new value of the bandwidth setting such that communications channel can accommodate the first anticipated change in the bandwidth requirement;

means for detecting a second event indicating a second anticipated change in the bandwidth requirement of a communications channel;

means for calculating a second new value for a bandwidth setting of the communications channel in response to detecting the second event; and means for further adjusting the bandwidth characteristic of the communications channel according to the second new value of the bandwidth setting such that communications channel accommodates the second anticipated change in the bandwidth requirement.

25. A method of managing the use of a communications channel of a network by a network application, the communications channel utilizing bandwidth allocated by a network communications device in the network, comprising:

detecting activity of the network application indicating that a new communications session will be established requiring a first anticipated change in bandwidth allocated to the communications channel;

calculating a first new value for an allocated bandwidth setting of the communications channel in response to detecting the network application activity;

negotiating with the network communications device to adjust a bandwidth characteristic of the communications channel according to the first new value of the allocated bandwidth setting to effect the first anticipated change in the bandwidth allocated to the communications channel;

detecting a second event indicating a second anticipated change in the bandwidth requirement of a communications channel;

calculating a second new value for a bandwidth setting of the communications channel in response to detecting the second event; and further adjusting the bandwidth characteristic of the communications channel according to the second new value of the bandwidth setting such that communications channel accommodates the second anticipated change in the bandwidth requirement.

26. A communications device comprising:

an communications interface;

a memory system;

a processor; and an interconnection mechanism coupling the communications interface, the memory system, and the processor;

wherein the memory system is configured with a bandwidth manager application, that when performed on the processor, provides a bandwidth manager process that manages the use of a communications channel of a network by a network application, the communications channel utilizing bandwidth allocated by the network communications device in the network, the bandwidth manager process performing the operations of:

detecting activity of the network application indicating that a new communications session will be established requiring a first anticipated change in bandwidth allocated to the communications channel;

calculating a first new value for an allocated bandwidth setting of the communications channel in response to detecting the network application activity;

negotiating with the network communications device to adjust a bandwidth characteristic of the communications channel according to the first new value of the allocated bandwidth setting to effect the first anticipated change in the bandwidth allocated to the communications channel;

detecting a second event indicating a second anticipated change in the bandwidth requirement of a communications channel;

calculating a second new value for a bandwidth setting of the communications channel in response to detecting the second event; and further adjusting the bandwidth characteristic of the communications channel according to the second new value of the bandwidth setting such that communications channel accommodates the second anticipated change in the bandwidth requirement.

27. In a communications device, the communications device being a browser enabled device, a method for dynamically adjusting bandwidth of a communications channel, the method comprising the steps of:

detecting a first event indicating a first anticipated change in a bandwidth requirement of the communications channel, the first event indicating a browser event requiring a browser in the communications device to access content from a remote computer system;

calculating a first new value for a bandwidth setting of the communications channel in response to detecting the first event, the first new value of the bandwidth setting of the communications channel being calculated to accommodate additional bandwidth used to receive the content from the remote computer system, calculating a first new value for a bandwidth setting of the communications channel in response to detecting the first event further comprising:
- determining if the bandwidth event contains a bandwidth determination factor, and if the bandwidth event contains a bandwidth determination factor:
  - i) extracting the bandwidth determination factor from the bandwidth event; and
  - ii) calculating the new value for the bandwidth setting based on the bandwidth determination factor;
- and if the bandwidth event contains a bandwidth determination factor, adjusting the bandwidth setting to at least one of a next higher level and a next lower level based on the bandwidth event;

adjusting a bandwidth characteristic of the communications channel according to the first new value of the bandwidth setting such that the communications channel can accommodate the first anticipated change in the bandwidth requirement;

detecting a second event indicating a second anticipated change in the bandwidth requirement of a communications channel;

calculating a second new value for a bandwidth setting of the communications channel in response to detecting the second event; and further adjusting the bandwidth characteristic of the communications channel according to the second new value of the bandwidth setting such that communications channel accommodates the second anticipated change in the bandwidth requirement, the first bandwidth event indicating an increased anticipated change in the bandwidth requirement of the communications channel and the second bandwidth event indicates a decreased anticipated change in the bandwidth requirements of the communications channel, the first new value of the bandwidth setting being greater than a former value of the bandwidth setting and the second new value of the bandwidth setting being less than the first new value of the bandwidth setting, such that:

i) the bandwidth characteristic of the communications channel is dynamically adjusted to raise the bandwidth of the communications channel in response to the first bandwidth event; and ii) the bandwidth characteristic of the communications channel is dynamically adjusted to lower the bandwidth of the communications channel in response to the second bandwidth event, the first bandwidth event indicating a browser event for at least one of:

i) a beginning of a communications session;

ii) a beginning of content processing;

and wherein the second bandwidth event indicating a browser event for at least one of:

i) an end of a communications session;

ii) an end of content processing; and iii) a timeout associated with an earlier bandwidth event.

* * * * *